Patented June 3, 1941

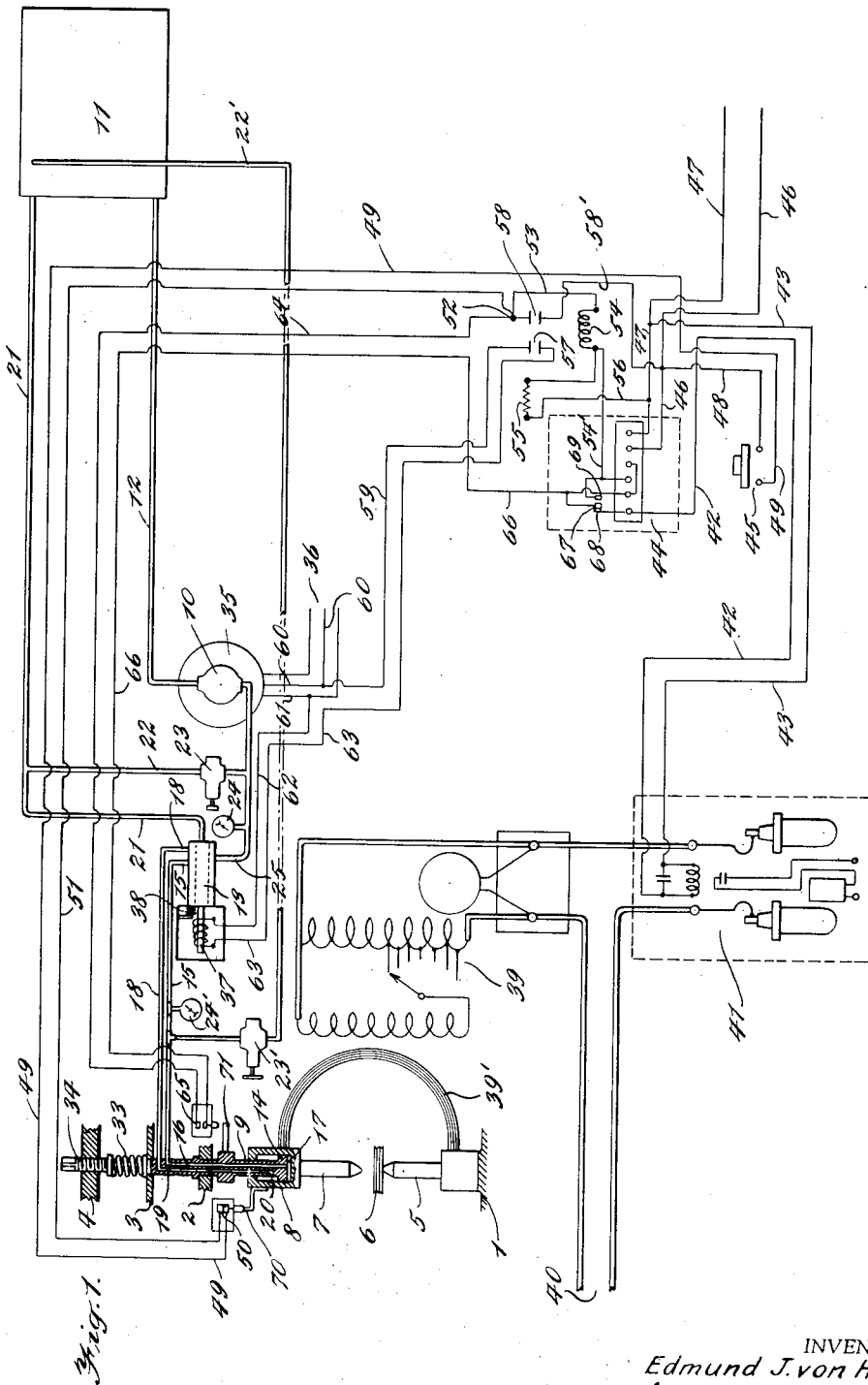

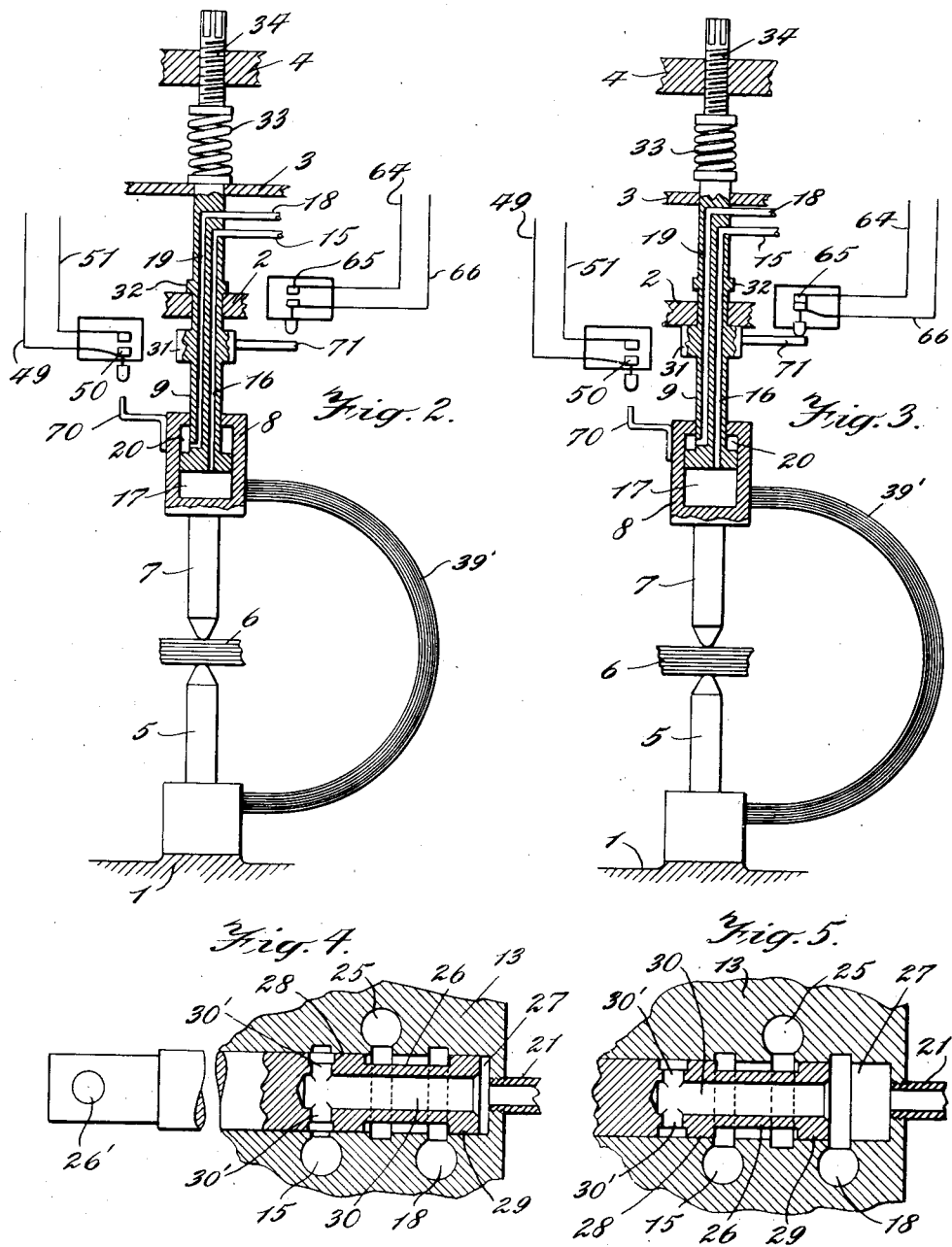

2,244,508

UNITED STATES PATENT OFFICE 2,244,508

ELECTRIC WELDING APPARATUS

Edmund J. von Henke and Arthur A. Grothe, Chicago, Ill., assignors to American Electric Fusion Corporation, Chicago, Ill., a corporation of Illinois Application November 13, 1939, Serial No. 304,028

13 Claims. (Cl. 219—4)

This invention relates to a novel and improved method for electric welding and also to a novel and improved apparatus for use in practicing that method. The invention will be better understood from the following description and the annexed drawings, in which we have shown a selected embodiment of an apparatus which may be used in practicing the method. Referring to those drawings:

Fig. 1 is a diagrammatic view showing parts of the apparatus which are necessary to an understanding of the inventions and also showing an electric circuit for operating the apparatus;

Fig. 2 is a view on an enlarged scale showing part of the apparatus appearing in Fig. 1, with certain parts in different positions;

Fig. 3 is a view similar to Fig. 2 but showing certain parts in still other positions;

Figs. 4 and 5 are longitudinal sectional views through the valve for controlling the operation of the movable electrode and showing the operation thereof.

Referring particularly to Fig. 1, we have shown therein a portion of a welding apparatus, omitting all parts which are not essential to an understanding of the invention. This apparatus may comprise the usual frame, parts of which are shown at 1, 2, 3, and 4, these parts being relatively fixed with respect to each other, and the part 1 supporting a relatively fixed electrode 5. For convenience it will be assumed that, as usual, the electrodes are vertically disposed so that work 6 which is to be welded may be rested upon the stationary electrode 5, after which the movable electrode 7 may be brought into contact with the work before the welding current is turned on. Such arrangements are broadly well known in the art, and usually the movable electrode is actuated by a cam.

According to our invention, the movable electrode 7 is operated by hydraulic or air pressure which, for the sake of convenience, will be referred to as hydraulic pressure. This electrode 7 is shown as being rigidly secured to a hydraulic ram 8 which is vertically movable upon a piston 9. Hydraulic pressure is furnished by a pump 10, and this pump may be of any desired form and, since its details are not necessary to an understanding of the invention, those details will not be described.

It will be assumed that the pump will pump oil from a reservoir tank 11 to which it is connected by a pipe 12 and then, according to our invention, it may discharge that oil through a valve 13 to one side or the other of the piston head 14. For this purpose there are two pipes leading from the valve to the ram, the pipe 15 connecting to a duct 16 in the piston which discharges into the space 17 below the piston head, whereas the pipe 18 connects to a duct 19 in the piston which discharges into the space 20 above the piston head. There is also provided an exhaust 21 from the valve 13 back to the reservoir 11 and also bypasses 22 and 22' controlled by one-way bypass valves 23 and 23', respectively. These valves are of the type which may be set to open at any desired pressure, and the gauge 24 is provided for showing the pressure at which the valve 23 is operating. A similar gauge 24' may be used to show the pressure at which the valve 23' is operating. Here again the details of the valves 23 and 23' are not necessary to an understanding of the invention and so will not be described, since such valves are well known. Usually the valve 23 will be set for a relatively high pressure, whereas the valve 23' may, if desired, be set for a relatively low pressure.

The valve 13 may take any one of several known forms, but for the sake of illustration we have shown a valve of a kind which may conveniently be operated by a solenoid, and the construction of that valve is best shown in Figs. 4 and 5, to which reference is now made.

In Fig. 4 the valve is shown in a position wherein the inlet 25 is connected to the pipe 18, this being the normally inoperative position of the valve. When the valve is in this position, the pressure exerted by the pump, and which may be determined by the setting of the valve 23, may for example be 400 pounds per square inch, and this pressure will of course be exerted in the space 20 to lift the ram 8 to some such position as indicated in Fig. 1 so as to separate the welding electrodes.

As shown, the valve comprises a body 26 movable in a chamber 27 to which are connected the inlet 25 and the pipes 15 and 18. The body 26 is provided with spaced heads 28 and 29, as indicated, and when the body is in the position shown in Fig. 4, it will be evident, as noted above, that the inlet is connected to the pipe 18, whereas the pipe 15 is connected to the exhaust 21 through a central bore 30 in the body which is connected in turn to transverse bores 30'. Now when it is desired to apply pressure at the space below the piston head, the valve body 26 is moved lengthwise of the chamber 27 by means to be described presently, until it reaches some such position as indicated in Fig. 5, wherein it will be seen that the inlet 25 is now connected with the pipe 15 and the pipe 18 is connected to the exhaust.

The piston is vertically movable in the frame parts 2 and 3, and in turn the ram is guided in its vertical movement by its engagement with the piston and piston head and by suitable guideways in the stationary frame. The amount of the vertical movement of the piston is limited by the frame part 2 on opposite sides of which are collars 31 and 32, as plainly shown in Figs. 1, 2, and 3, the collar 31 limiting upward movement of the piston and the collar 32 limiting downward movement of the piston, both by engagement with the frame part 2. Upward movement of the piston is resisted by a compression spring 33, the force of which may be adjusted by a screw 34, as indicated.

The sequence of operations of the apparatus above described is as follows:

Assuming that the parts are in the position shown in Fig. 1, the work 6 is put in place between the electrodes and then, by means to be described presently, the valve 13 is operated so as to connect the space 17 to the pump through the pipe 15 and to connect the space 20 to the exhaust pipe 21 through the pipe 18. Then the hydraulic pressure in the space 17, determined by the setting of the valve 23', will build up and force the ram down, to cause the electrode 7 to contact with the work 6, as shown in Fig. 2. By means to be described presently, the welding current is then applied through the electrodes and at the same time, as the pressure in the space 17 continues to build up, the piston 9 is raised against the force of the spring 33, until the collar 31 engages the stop formed by the frame part 2, as shown in Fig. 3. The result thus is a gradual building up of the hydraulic pressure and the spring pressure to a maximum and then, by means to be described presently, the welding current is turned off and the valve is again operated to return the parts to initial position.

The electric circuit for controlling the above operations will now be described.

The pump 10 may be operated by a motor 35, which may be actuated by current supplied from a line 36, and the valve 13 is preferably operated by a solenoid 37 which, when energized, will move the valve body from the position shown in Fig. 4 to that shown in Fig. 5, against the action of a spring 38. The plunger of the solenoid may be connected to the body 26 of the valve at 26', by any suitable connection (not shown).

The welding current preferably is alternating current and may be supplied by any suitable type of transformer having a primary 39 and a secondary 39'. In this particular instance the transformer is shown as of the auto coil type, but the invention may be practiced with any other type, the welding current being supplied from the main 40, for example at 440 volts, 60 cycles. This current may be controlled by a suitable contactor, here indicated more or less diagrammatically at 41. The particular kind of contactor shown is one well known in the art by the trade name of "Weldotrol," that type of contactor being selected merely as illustrative. For some kinds of work, of course, a contactor may not need to be used. The contactor is shown as being connected by leads 42 and 43 to terminals of a timing device 44. Here again this timing device is of any well known or suitable form, the details of which are not necessary to an understanding of the invention and so will not be described.

The operation of the device is controlled primarily by a switch 45, which may for convenience be referred to as a "manually operated" switch, even though normally it probably will be operated by the foot of the operator, as is common in welding apparatus. This switch is placed in a circuit which receives power through the two leads 46 and 47, connected to a suitable source of current, for example 110 volt, 60 cycle A. C. The lead 46 is connected to one side of the switch 45 by the conductor 48, and from the other side of the same switch leads a conductor 49 to one side of a switch 50, which may hereinafter be referred to for convenience as the ram switch. The other side of that switch is connected through a conductor 51 to a binding post 52 and that binding post in turn is connected through a conductor 53, relay 54, resistor 55, and conductor 56 to the lead 47.

The relay 54 controls two switches 57 and 58. The switch 57 controls a circuit leading therefrom through conductor 59, part of the lead 60, motor 35, part of the lead 61, conductor 62, solenoid 37, and conductor 63, back to the switch 57. The switch 58 controls a circuit including lead 46, conductor 58', switch 58, conductor 64, switch 65 (which may be sometimes referred to as the piston switch), conductor 66, and contact 67, which may engage the contact 68 or the contact 69. When engaging contact 68, then the circuit is completed through conductor 42, contactor 41, conductor 43 and lead 47; when engaging contact 69, then the relay 54 will be shorted through resistor 55, as described later.

The ram switch 50 is normally closed when no welding is taking place, and then is kept closed by means of an arm 70 fixed upon the ram 8, as shown in Fig. 1. The switch 65, on the other hand, is normally open when no welding is taking place, as shown in Fig. 1, but may be closed by an arm 71 on the piston, as shown in Fig. 3. Of course, it will be understood that the switches 50 and 65 are provided with springs tending to open them except when they are held closed by the arms 70 and 71.

In operation, assuming that the work 6 has been placed in position on the stationary electrode 5, then the foot switch 45 may be closed, completing the circuit through the relay 54 and the ram switch 50, as described above. Energizing of the relay will close the switches 57 and 58, and the closing of the switch 57 will complete the circuit through the solenoid 37, as described above.

At the same time, the closing of the switch 58 will complete a locking circuit including the lead 46, conductor 58', switch 58, conductor 50, relay 54, resistor 55, conductor 56, and lead 47, thus locking the relay and keeping it energized to keep the switches 57 and 58 closed, even though the foot switch 45 may be allowed to open. Thus, after the foot switch 45 is once closed, the relay 54 will remain energized until de-energized by means to be described presently, regardless of whether the foot switch be open or closed. While it remains energized, the solenoid 37 will hold the valve 13 in the position shown in Fig. 5 so as to permit the pump to supply oil under pressure to the space 17. As soon as the ram 8 moves downwardly, the ram switch 50 will open, but nevertheless the relay remains energized by the locking circuit. This relay is de-energized by operation of the timer through the circuits now to be described.

The timer mechanism includes the contact 67 which normally is in engagement with the contact 68 but which, after the expiration of a predetermined time, is moved by the timing mechanism out of engagement with the contact 68 and into engagement with the contact 69. Timing mechanisms operating in that manner are well known in the art and so the details of such a mechanism have not been described. It is sufficient to say that the time at which the contact 67 moves as described above, may be regulated as desired, and that the timing device is operated by any suitable source of power, such as an electric motor or electronic means.

During the welding operation, after the parts have moved to the positions shown in Fig. 2, then, as described above, they will come to the positions shown in Fig. 3. The arm 71, shortly before reaching the position shown in Fig. 3, will close the piston switch 65 and this closing will complete the circuit through the source of power of the timing device, and thus start operation of that device. That source of power is energized by current which passes from the lead 46 to the timing device and through the timing device to the conductor 66, switch 65, conductors 64 and 53, relay 54, conductor 54', to the timing device and thence through the timing device to the lead 47. So long as the contacts 67 and 68 are in engagement, there will also be provided a circuit through the contactor 41. Thus, immediately upon closing of the switch 65 welding current will be supplied to the electrodes by the transformer, under control of the contactor.

However, as the timing device operates, after a predetermined time the contact 67 will move out of engagement with the contact 68 and into engagement with the contact 69, breaking the circuit controlling the contactor and thus breaking the welding circuit. At the same time engagement with the contacts 67 and 69 will cause a shorting of the relay 54 through the conductors 53 and 64, switch 65, conductor 66, contacts 67 and 69 and conductor 54'. The relay will thus be de-energized and the switches 57 and 58 will be opened, it being understood that, as usual in relays, these switches are biased in one direction by suitable springs. In the present instance the springs tend to keep the switches 57 and 58 open.

Upon opening of the switch 57, the solenoid 37 will be de-energized and then the spring 38 may bias the valve body 26 back to its normal inoperative position shown in Fig. 4. The pump 10 will then supply hydraulic pressure to the space 20 instead of to the space 17 and the result will be that the ram 8 and the piston 9 will return to the positions shown in Fig. 1. The piston will be moved first, opening the piston switch 65, and then the ram will be moved, lifting the electrode 7 out of contact with the work, and closing the switch 50. If the foot switch is still closed, then the cycle of operations will start again, but if not, then operations will cease until such time as the foot switch is again closed. It will be understood that, by the time the ram switch is closed, the contact 67 has returned into engagement with the contact 68, by normal operation of the timing device.

The above arrangement has advantages, some of which will be briefly described.

In welding with an apparatus of a general type involving a stationary electrode with a movable electrode above it as in this application, after the work is placed on the stationary electrode, the movable electrode is moved into contact with the work, as known in the art. The clear space between the top of the work and the upper electrode when welding is not taking place should be substantially constant within a very narrow range. When the work is uniform, then the movable electrode is adjusted once for all, but where the thickness of the work varies, then there should be continuous adjustment of the movable electrode in order to get proper timing, where the apparatus is operated by positive means such as cams and even where such apparatus is provided with one or more springs between the cam and the electrode. However, with the use of the apparatus described above, no adjustment is necessary for ordinary variations in the thickness of the work.

Whatever may be the rate of speed at which the movable electrode moves, the welding time remains constant, since this time is controlled by the timer, and the timer in turn is controlled by the piston, which in turn is controlled by engagement of the movable electrode with the work.

Another advantage of the apparatus described above is that the spring 33 determines the starting pressure exerted at the weld and this pressure can be adjusted as desired.

Another advantage is that in a cam operated machine, since the welding part of the cycle is fixed, if speeding up of the motor is done in order to expedite the work, then the welding time is cut down in proportion. On the other hand, in the apparatus described above the welding time is always constant and the electrodes may be brought nearer together if desired, thus cutting down the part of the cycle of operations taken up in relative movement of the electrodes. In a cam operated machine, of course, the amount of this relative movement is determined by the cam and cannot be varied except by changing the cam, whereas with a hydraulically operated device, controlled entirely by the amount of pressure used, the motion of the movable electrode may be cut down to a minimum.

The bypass valve 23 is usually set to operate at a relatively high pressure, as noted above, so as to provide a high enough pressure to lift the ram quickly. On the other hand, it is sometimes desirable to use a low welding pressure and therefore the second bypass valve 23' is provided, which may be set at a relatively low welding pressure or in fact at any desired welding pressure, without disturbing the relatively high pressure setting of the bypass valve 23 and also without materially affecting the rate of travel of the ram downwardly from the position shown in Fig. 1 to the position shown in Fig. 2. Of course, it will be understood that the downward movement of the ram does not require as much pressure as the upward movement against the weight of the ram and electrode 7.

The speed at which welding is to be done naturally varies with different jobs, but the apparatus described above is readily adaptable to a wide variety of jobs.

Other advantages will readily suggest themselves to those skilled in the art and it will also be evident that various changes in details may be made without departing from the invention as defined in the appended claims.

We claim:

1. An electric welding apparatus comprising a stationary and a movable electrode, a piston having a head, a ram slidably mounted on said piston and connected to said movable electrode, a spring opposing the movement of said piston away from said stationary electrode, means limiting movement of the piston towards the stationary electrode, means to supply hydraulic pressure selectively to opposite sides of said piston, whereby said ram may be moved in either direction on the piston to move the movable electrode toward or away from the stationary electrode, and means limiting movement of the piston against the action of the spring.

2. An electric welding apparatus comprising a stationary and a movable electrode, a piston having a head, a ram slidably mounted on said piston and connected to said movable electrode, a spring opposing the movement of said piston away from said stationary electrode, means limiting movement of the piston towards the stationary electrode, means to supply hydraulic pressure selectively to opposite sides of said piston, whereby said ram may be moved in either direction on the piston to move the movable electrode toward or away from the stationary electrode, means limiting movement of the piston against the action of the spring, an electric circuit controlling the supply of said hydraulic pressure and including a manually operated switch and a second switch, and means to close said second switch when said ram is moved by said hydraulic pressure away from said stationary electrode.

3. An electric welding apparatus comprising a stationary and a movable electrode, a piston having a head, a ram slidably mounted on said piston and connected to said movable electrode, a spring opposing the movement of said piston away from said stationary electrode, means limiting movement of the piston towards the stationary electrode, means to supply hydraulic pressure selectively to opposite sides of said piston, whereby said ram may be moved in either direction on the piston to move the movable electrode toward or away from the stationary electrode, means limiting movement of the piston against the action of the spring, means to supply welding current to said electrodes, a circuit controlling said last-named means, a switch in said circuit closed by movement of said piston against the action of said spring and opened by movement of said piston under the action of the spring, and means for adjusting the spring.

4. An electric welding apparatus comprising a stationary and a movable electrode, a piston having a head, a ram slidably mounted on said piston and connected to said movable electrode, a spring opposing the movement of said piston away from said stationary electrode, means limiting movement of the piston towards the stationary electrode, means to supply hydraulic pressure selectively to opposite sides of said piston, whereby said ram may be moved in either direction on the piston to move the movable electrode toward or away from the stationary electrode, means limiting movement of the piston against the action of the spring, an electric circuit controlling the supply of said hydraulic pressure, means to supply welding current to said electrodes, a circuit controlling said last-named means, a switch in said first-named circuit controlled by movement of said ram, and a switch in said second-named circuit controlled by movement of said piston.

5. An electric welding apparatus comprising stationary and movable electrodes, a slidable piston having a head, a ram slidably mounted on said piston and connected to said movable electrode, means yieldably opposing the movement of said piston away from said stationary electrode, means to supply hydraulic pressure selectively to opposite sides of said piston, whereby said ram may be moved in either direction on the piston to move the movable electrode toward or away from the stationary electrode, and means limiting movement of the piston in either direction.

6. An electric welding apparatus comprising a stationary and a movable electrode, a piston having a head, a ram slidably mounted on said piston and connected to said movable electrode, a spring opposing the movement of said piston away from said stationary electrode, means limiting movement of the piston towards the stationary electrode, means to supply hydraulic pressure selectively to opposite sides of said piston, whereby said ram may be moved in either direction on the piston to move the movable electrode toward or away from the stationary electrode, means limiting movement of the piston against the action of the spring, means to control the supply of hydraulic pressure by movement of the ram, and means to supply welding current to the electrodes, said last-named means being controlled by movement of the piston.

7. An electric welding apparatus comprising a stationary and a movable electrode, a piston having a head, a ram slidably mounted on said piston and connected to said movable electrode, a spring opposing the movement of said piston away from said stationary electrode, means limiting movement of the piston towards the stationary electrode, means to supply hydraulic pressure selectively to opposite sides of said piston, whereby said ram may be moved in either direction on the piston to move the movable electrode toward or away from the stationary electrode, means limiting movement of the piston against the action of the spring, means to supply welding current to said electrodes, a circuit controlling said last named means, a switch in said circuit, and means on said piston closing said switch when the piston has approximately completed its travel against the action of the spring, said switch opening when said spring moves said piston in the opposite direction.

8. An electric welding apparatus comprising a stationary and a movable electrode, a piston having a head, a ram slidably mounted on said piston and connected to said movable electrode, a spring opposing the movement of said piston away from said stationary electrode, a stop limiting movement of the piston towards the stationary electrode, means to supply hydraulic pressure selectively to opposite sides of said piston, whereby said ram may be moved in either direction on the piston to move the movable electrode toward or away from the stationary electrode, a stop limiting movement of the piston against the action of the spring, said stops limiting movement of the piston to a predetermined amount, means to supply welding current to said electrodes, a circuit controlling said last-named means and having a switch therein, and means operated by movement of said piston between said stops to open and close said switch, movement of the piston against the action of the spring closing the switch.

9. An electric welding apparatus comprising a stationary and a movable electrode, a slidable piston having a head, a ram slidably mounted on said piston and connected to said movable electrode, means yieldingly opposing the movement of said piston away from said stationary electrode, means to supply hydraulic pressure selectively to opposite sides of said piston, whereby said ram may be moved in either direction on the piston to move the movable electrode toward or away from the stationary electrode, means limiting movement of the piston in either direction, means to supply welding current to said electrodes, a circuit controlling said last-named means and having a switch therein, and means operated by movement of the piston to open and close the switch.

10. An electric welding apparatus comprising a stationary and a movable electrode, means to supply welding current to said electrodes, a circuit controlling said last-named means and having a switch therein, two operating elements comprising a slidable piston having a head and a ram slidably mounted on said piston, means to supply hydraulic pressure selectively to opposite sides of said piston to cause relative movement between said piston head and said ram, said movable electrode being connected to one of said elements, means on the other of said elements to open and close said switch upon movement of said other element, and means yieldingly resisting movement of said last-named element in the direction to operate said switch to supply said welding current.

11. An electric welding apparatus comprising a stationary and a movable electrode, a frame, a headed piston slidably supported on said frame and having two stops adapted to contact with said frame to limit the sliding movement of said piston, a ram slidably mounted on said piston and connected to said movable electrode, a spring yieldingly opposing the movement of said piston away from said stationary electrode, means to vary the force exerted by said spring, means to supply welding current to said electrodes, a circuit controlling said last-named means and having a switch therein adjacent said piston, a projection on said piston arranged to close said switch upon movement of the piston against action of said spring, a valve to supply hydraulic pressure selectively to opposite sides of the head of said piston, an electric circuit controlling said valve and including a manually operated switch and a second switch adjacent said ram, and a projection on said ram arranged to close said second switch when said ram is moved by said hydraulic pressure to move the movable electrode away from said stationary electrode.

12. In an electric welding apparatus the combination of a stationary electrode, a relatively fixed abutment, a movable member, means engaging said abutment and yieldably opposing the movement of said member in one direction, a movable electrode, piston and cylinder connecting means between said movable member and movable electrode, and means for operating said connecting means to force said movable electrode against work with a pressure dependent upon the resistance of said yieldable means.

13. In an electric welding apparatus the combination of a stationary electrode, a relatively fixed abutment, a movable member, means engaging said abutment and yieldably opposing the movement of said member in one direction, a movable electrode, piston and cylinder connecting means between said movable member and movable electrode and operative to force said movable electrode against work with a pressure dependent upon the resistance of said yieldable means, means to supply welding current to said electrodes, a circuit controlling said last-named means, a switch in said circuit, means actuated by movement of the piston to close said switch upon movement of the piston against the action of said yieldable means, a valve to supply pressure selectively to opposite sides of the head of said piston, an electric circuit controlling said valve and including a manually operated switch and a second switch, and means actuated by movement of the cylinder to close said second switch when said cylinder is moved to actuate the movable electrode away from said stationary electrode.

EDMUND J. von HENKE.
ARTHUR A. GROTHE.